INVENTORS.
JACK PAUL MORRIS
WALTER MORRIS
BY
ATTORNEYS

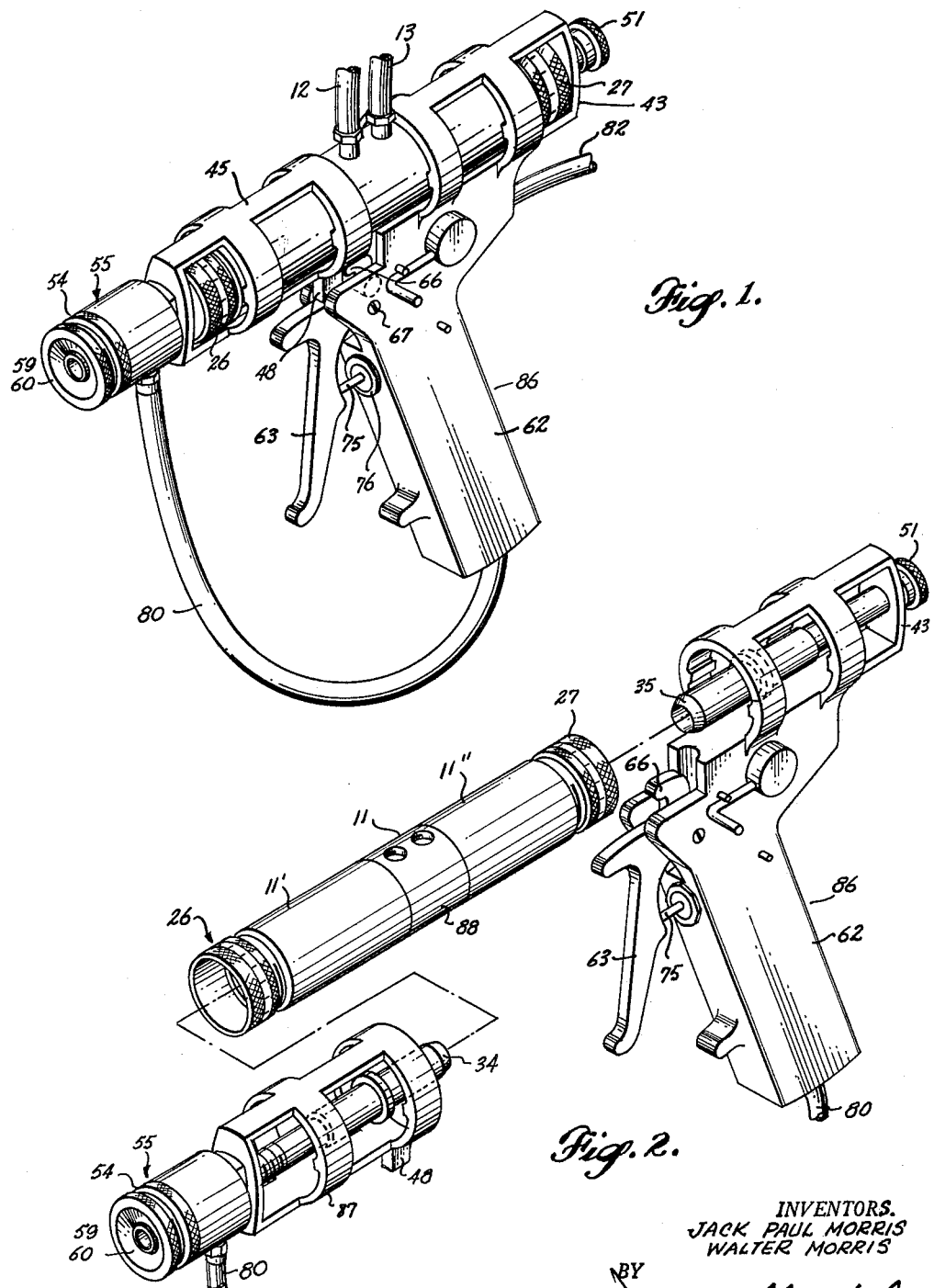

June 11, 1963 J. P. MORRIS ET AL 3,093,311
METERING MIXING SPRAY EQUIPMENT
Filed Oct. 4, 1961 3 Sheets-Sheet 3
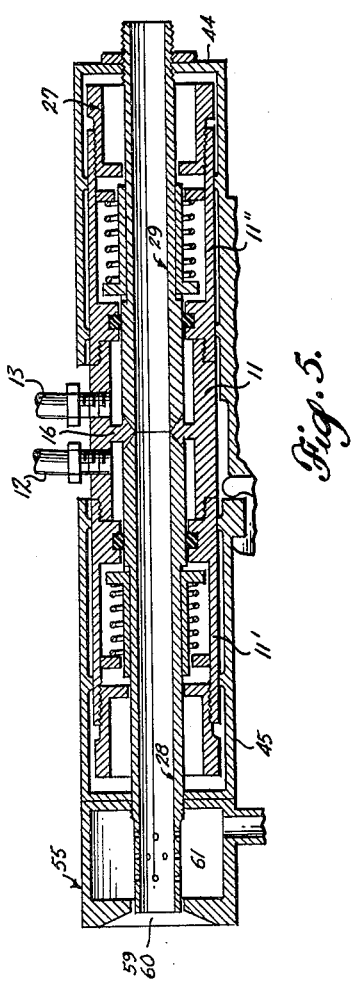
INVENTORS.
JACK PAUL MORRIS
WALTER MORRIS
BY
ATTORNEYS United States Patent Office 3,093,311
Patented June 11, 1963

3,093,311
METERING MIXING SPRAY EQUIPMENT
Jack Paul Morris, 416 East View Ridge, and Walter Morris, 1009 Colby, both of Everett, Wash.
Filed Oct. 4, 1961, Ser. No. 142,826
12 Claims. (Cl. 239—142)

This invention relates generally to the field of spraying equipment and more particularly to apparatus for spraying liquid plastics. The spraying of liquid plastics is known to be the low cost way of applying them to serve either as a protective coating for structures or as a filling material within structures. However, in following spraying techniques, many difficulties have been encountered for a chemical catalyst and accelerator must be added to the liquid resins in order to obtain curing of the plastics at ordinary temperatures within a reasonable period of time.

Prior attempts to mix such liquids within a spraying apparatus are generally not considered to be successful because of the difficulties in keeping the equipment in order and free of cured internal plastic residues throughout a working day. The present preferred custom is to operate with two spray guns essentially operating as a unit but separately ejecting two fluids in a spray form which mix in the air on the way to the object to be either coated or filled with plastic.

The invention described herein in its operation successfully "mixes the plastic liquids within the spraying equipment prior to their combined ejection" to serve as coatings or fillers. By using this spray equipment jobs are accomplished successfully because of the unique design of the operating parts which can be maintained in a state of readiness throughout a working day and quickly cleaned thoroughly at the end of a working shaft. The obtainment of these successful results assures the user of this spray equipment that he once again can acquire the proper properties of the final plastic coating or filling material with respect to the proper proportions and the thorough mixing. This sprayer is designed to receive the plastic ingredients, liquid resins, which previously are purposely separated for one liquid contains the catalyst and the other liquid contains the accelerator. Thereafter, on controlled ratios the liquids are first mixed together and then mixed with air within the sprayer for their ultimate ejection which is controlled by employing surrounding streams of air directed at the places where the plastics are intended to be used.

Briefly described, the sprayer comprises a barrel body having internal chambers for receiving the separated liquids and internal guides for controlling the motion of internal valves. The internal valves are arranged for opposed motion moving together to the closed position and moving apart to various open positions. At least one valve has a hollow stem to receive, mix and guide the previously separated liquids toward their point of ejection from the sprayer. Also there is a mixing head on the hollow stem to receive, mix and eject the mixed liquids with air. In addition there is a self-contained coordinated means in the sprayer to control the ratios of the mixed liquids, the quantity of the mixing air and the duration of the simultaneous flow of all liquids and air.

The advantages of this invention centering on these features will become more apparent from the following detailed description when read in conjunction with the appended drawings wherein:

FIGURE 1 is a perspective view of a preferred form of the spraying apparatus utilized in mixing and spraying liquids.

FIG. 2 is a perspective but exploded view of the spraying apparatus of FIG. 1, showing three distinguishable assemblies that move relative to one another.

FIG. 5 is a view similar to FIG. 3, but showing the spraying apparatus somewhat schematically and with the cleaning plug removed.

FIG. 6 shows the removed cleaning plug assembly; and

FIG. 7 shows an interchangeable, internal, rotatable, mixing blade and power drive shaft therefor, also removed, which can be inserted in the spraying apparatus in place of the cleaning plug assembly.

Throughout these figures of the drawings, like parts are identified by the same numerals and substantially similar parts will in most instances have numerals closely associated with one another in numerical sequence.

As shown in FIGURE 1, the spraying apparatus 10, which is called a meter-mix-sprayer 10, is designed for convenient handling much like conventional commercial spraying units for paint employing pistol grips. However, the meter-mix sprayer could be designed for incorporation into other equipment, either stationary or portable, and there would be no need for hand pistol grips or the like. Such equipment (not shown) could be operated remotely and automatically by mechanical, electrical or hydraulic means (not shown). Furthermore although this spraying apparatus 10 is described in conjunction with spraying plastic ingredients, any liquids could be metered and sprayed.

Figure 3:
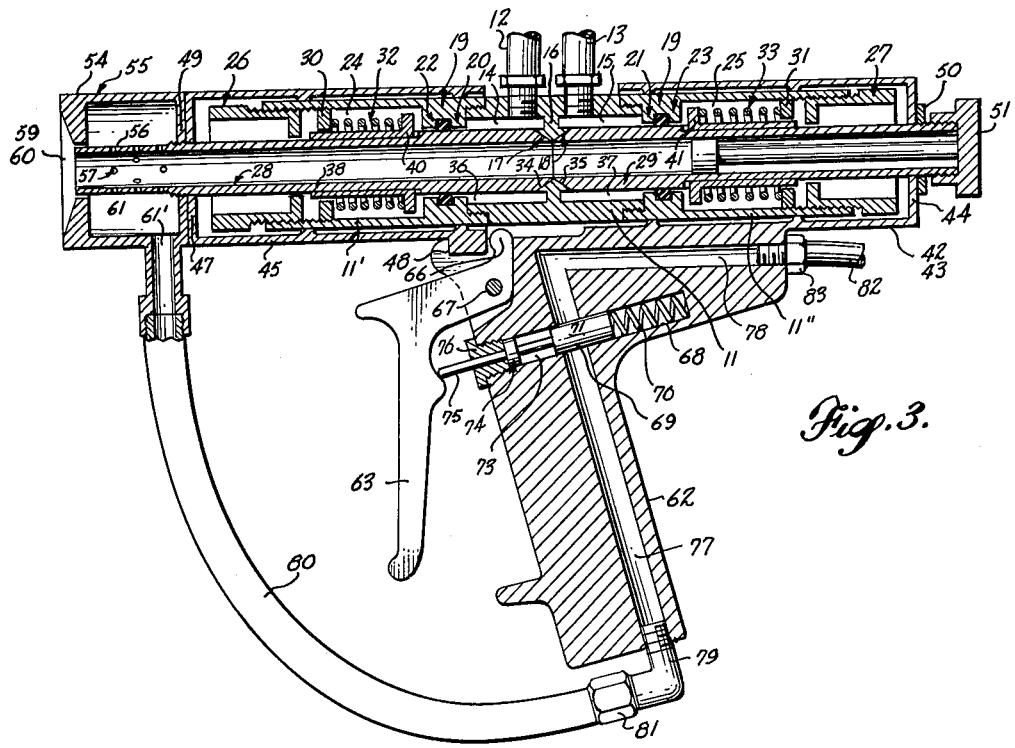
FIG. 3 is a sectional view of the spraying apparatus shown in FIGS. 1 and 2 with the parts arranged in their closed position.

Referring to FIG. 3, the cross sectional view of the components of the spraying apparatus shown in their non-use or closed position, the structure and relative positioning of the parts will be explained by first referring to the barrel body portion 11. It is made in three sections 11, 11' and 11", primarily for manufacturing convenience and also for convenience of cleaning. The central portion of this barrel section 11 has liquid receiving inlets 12 and 13 adjacent to one another at its center. Internally these inlets terminate in liquid chambers 14 and 15 which are only recesses if the barrel only is considered. At the mid point of the barrel 11 the liquid chambers 14 and 15 have a common wall section 16 which has valve seats 17 and 18 formed in a back to back relationship. In the opposite sense, the liquid chambers 14 and 15 terminate in structure 19 that provides for valve guides 20 and 21 which in turn encompass valve and chamber seals 22 and 23. Beyond the liquid chambers 14 and 15 in the opposite sense are two additional chambers called valve spring recesses 24 and 25, and within these recesses are valve stops 26 and 27 readily adjustable for controlling the opening of the valves 28 and 29 themselves. In addition, within the spring chambers or recesses 24 and 25, there are valve spring retainer abutments 30 and 31, also readily adjustable, and the valve springs 32 and 33. All of this structure is confined within the sections 11, 11' and 11" of the barrel.

Insertable in this barrel construction are acting hollow stem valves 28 and 29 which are alined with one another. Their ends 34 and 35 which abut one another are made of a suitable sealing material to make an excellent contact with the valve seats 17 and 18. The valves 28 and 29 have constant diameter sealing sections 36 and 37 from the abutting ends 34 and 35 to the chamber seals 22 and 23 and reduced diameter sections 38 and 39 from the chamber seals 22 and 23 throughout the remainder of the interior of the spraying apparatus 10.

To facilitate assembly and subsequent cleaning, the valve stems 28 and 29 have associated flanged sleeves 40 and 41 which slide over the reduced diameter sections 38 and 39 of the valve stems 28 and 29 to serve as a confining member of the valve springs 32 and 33 in conjunction with the spring retainer abutments 30 and 31. This assembly insures the continuance of the spring forces trying to return the valves to their closed positions. The springs 32 and 33 and the flange valve sleeves 40 and 41 are held in place by the adjustable valve spring retainer abutments 30 and 31.

Around the rear of the barrel section 11" is a concentric outer housing sleeve 42. This rear outer sleeve 42 has a large end 43 to encompass the barrel section 11", and an opposite small end 44 to encompass the valve stem 29. The sleeve 42 is cut away for lightness and access to the readily adjustable valve stop 27.

In the opposite sense there is a front concentric outer housing sleeve 45 having a large end 46 to encompass the barrel section 11 and an opposite small end 47 to encompass the valve stem 28. It likewise is cut away for lightness and access to the valve stop 26. In addition it has a lug 48 extending below the sleeves large end 46.

As the reduced diameter sections 38 and 39 of the valves 28 and 29 protrude through the respective housing sleeves 42 and 45, nuts 49 and 50 are threaded on them to confine the housing sleeves 42 and 45 to the valves 28 and 29 and to transmit motion to the valves 28 and 29 by movement of the housing sleeves 42 and 45.

A plug 51 having a cap 52 and a plunger 53 is used to block the open end of the hollow valve stem 29 at the rear of the sprayer. This plug assembly 51 is removed at any time for easy access to the interior of the sprayer for interim and complete cleaning.

On the projecting end of the opposite hollow valve stem 28 is a multiple piece adjustable air mix and control spray nozzle 54. This mixing head nozzle 54 has a large diameter nozzle shell section 55 threaded to the hollow valve stem 28 as an enlarged extension thereof. The nozzle 54 also contains an inner hollow sleeve 56 especially formed of the approximate like diameter of the hollow valve stem 28 and with small radially located apertures 57. The mixing head nozzle 54 terminates with a large diameter ejection section 58 having an adjustable two-pieced flared nozzle exit 59, 60 which construction also serves to complete the air chamber 61 surrounding the apertured inner hollow sleeve 56. This air chamber 61 has an air receiving inlet 61' in the large diameter nozzle shell 55 which provides access to this air chamber 61 for incoming air injected under pressure.

To conveniently cause movement of the valves 28 and 29 relative to one another, a handle 62 of pistol grip configuration is attached to the bottom of the rear housing sleeve 42. The handle 62 has a finger trigger 63 which is pivotally secured to the handle 62 at its top 64 within a recess 65 in the handle with a pawl end 66 extending beyond the pivot 67. The trigger 63 is held out from the handle 62 and its pawl 66 confined within the recess 65 by the action of a compression spring 68 until the pawl 66 moves to contact the lug 48. This same compression spring 68 is a vital part of the air valve 69 which likewise is contained in the handle 62 in a cylindrical recess 70. The valve 69 has an internal plug section 71 which abuts the compression spring 68 at the dead end 72 of the recess 70. This plug section 71 has a reduced diameter section 73 and a guide section 74 and then a second reduced section 75 which extends beyond the handle 62 to contact the trigger 63 at all times under the force of the spring 68. A threaded plug 76 maintains the valve 69 and spring 68 in position within the handle 62.

Throughout the handle 62 there is an air passageway 77 of a diameter similar to the plug section diameter 71 of the air valve 69. This passageway 77 parallels the housing 42, turns and intersects the valve recess 70 at right angles, to conduct air from the inlet 78 to the outlet 79.

As shown in FIGURE 1, air line 80 connects the air outlet 79 on the bottom 81 of the handle 62 to the air inlet 61' on the nozzle shell 55. Also air line 82 connects the air inlet 78 near the top 83 of the handle 62 to a pressurized air source, not shown. A liquid line connects the barrel liquid inlet 12 to one liquid source, not shown, which has its pressure subject to regulation at its source and a second liquid line similarly connects the other barrel liquid inlet 13 to another liquid source, not shown, which also has its pressure independently regulated.

Figure 4:
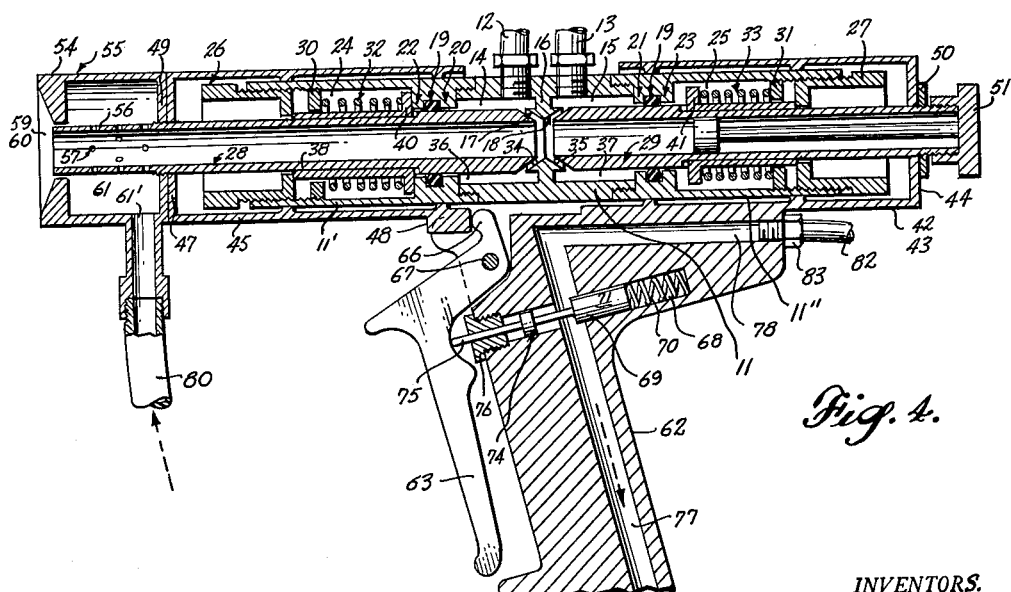
FIG. 4 is a sectional view of the spraying apparatus, similar to FIG. 3, with the parts arranged in their open position.

The specific operation of the mechanism of the spraying apparatus 10 to control the flow and mixing of the liquids and subsequently their mixing with air in the final ejection can best be understood by noting the changes in part locations from FIG. 3 to FIG. 4, and the three sub-assemblies of FIG. 2. In this exploded view of the selected embodiment, the hand grip 62 and the trigger 63 are shown attached to the rear housing 42. In addition, FIG. 2 shows how the rear valve member 29 becomes, after assembly, a part of this rear assembly 86. The forward assembly 87 comprises the forward housing 45 and lug 48, the hollow valve 28 and the mixing head nozzle 54. The remaining central assembly 88 is the sectional barrel 11, 11', 11" with the chambers 14 and 15 for receiving the liquids, structure 19 for guiding the valves and sealing purposes, and the additional recesses 24 and 25 containing the springs 32 and 33. These springs 32 and 33 serve two functions simultaneously by always tending to return the valves 28 and 29 to the closed position while at the same time tending to equally distribute the force which is tending to separate the two valves 28 and 29.

The basic motion which sets all this movement on its way is commenced as the trigger 63 is pressed toward the pistol grip handle 62. This movement causes pivoting of the pawl 66 of the trigger 63 establishing contact with the lug 48 on the forward housing 45, moving the forward assembly 87 away from the rear housing 42 in its associated rear assembly 86. The sectional barrel 11, 11', 11" seeks its intermediary position depicted in FIG. 4 with drawing both valves 28 and 29 from their respective seats 17 and 18 and opening the liquid chamber 14 and 15. When this occurs, the liquids pass from the chambers 14 and 15 into the interior of the hollow valves 28 and 29. Mixing starts and continues throughout the length of the hollow valve 28. As the mixing liquids reach the mixing head nozzle 54, the influx of air under pressure, with the surrounding ejector effect of additional quantities of compressed air, results in uniform and rapid ejection of thoroughly mixed ingredients. The plastic sprayed on the surface to be coated or in a space to be filled is completely controlled in quantity and quality assuring that the resulting job is well done. At all times when the trigger is pressed toward the handle grip, the simultaneous flow of air and plastics is assured by the coordinated way in which the trigger 63 both depresses the plunger of the air valve arrangement in the handle and moves the assemblies 86, 87, 88 relative to another. In the event like plastic flows from chambers 14 and 15 are not desired, that is to say one valve opening is to exceed the other valve opening, then the calibrated positioning of the valve stops 26 and 27 will override equalizing tendencies of the valve springs 32 and 33 causing one valve to stop in its opening motion while the other one will continue. In this way various ratios can be obtained in the mixing liquids as they enter the hollow stem portions of the valves 28 and 29.

On some occasions very viscous materials may be injected into the meter-mix sprayer and under such operating conditions the more viscous materials may require some mechanical mixing within the sprayer. To increase the effectiveness of the operation of the sprayer when using the more viscous materials, the air mixing is supplemented by mechanical mixing. In FIGURE 7 a mechanical mixing means that does this added function is shown apart from the meter-mix sprayer. FIGURES 5, 6 and 7 indicate how the mechanical mixing means can be substituted in place of the plug assembly 51.

This mixing means 90 can be constructed as indicated in FIGURE 7. Along a continuous shaft 91 spiral paddle blades 92 are mounted. One continuous blade (not shown) could be used. Each is equipped with sufficient apertures 94 permitting flow through the blades in conjunction with the main flow along the blade axis as directed by the spiral action and the air ejection action. The blades 94 could serve to provide their own bearing surfaces for contacting the valve interiors if they were made of a suitable material such as nylon. Or if other materials were used, it might be more desirable to provide centering bearings 96 on the shaft 91 as indicated in FIGURE 5 and allow for some clearance between the blades and the valve interiors. A threaded end cap 97, very similar to the cap 52, but equipped with seals 98 and provided with a central bore 99 to accommodate the shaft 91 is positioned along the shaft 91 by the shaft groove 100 and lock ring 101 that provide the abutment that limits the insertion of the mixing means 90.

The continuous shaft 91 through coupling flanges 103 is bolted 104, 105 to a power shaft 106 which may be driven by any suitable power source (not shown) at a variable r.p.m. up to approximately 10,000 r.p.m.

The employment of a high speed mixing means of this general type increases the versatility of the meter-mix sprayer so that it can be used to spray very viscous materials.

What is claimed is:

1. A liquid metering, mixing and spraying mechanism comprising, a first liquid source having valve seat means in communication therewith; a cylindrical member having first and second ends, the first end thereof having a valve forming surface, and the second end terminating into a nozzle head; means normally biasing the first end of said cylindrical member into engagement with said valve seat means; a second liquid source; valve means for said second liquid source, said valve means being in a normally closed position and when open communicating said second liquid source with the interior of said cylindrical member; means for simultaneously moving said cylindrical member away from said valve seat means and opening said second liquid valve means, whereby the first and second liquids are simultaneously admitted into the interior of said cylindrical member and mixed therein; and means for ejecting such mixture from the nozzle head in the form of a spray.

2. A metering, mixing and spraying mechanism in accordance with claim 1, wherein the means for ejecting the liquid mixture from the nozzle head comprises an air stream.

3. A metering, mixing and spraying mechanism in accordance with claim 2, wherein means are provided for mixing air with the first and second liquids prior to ejection from the nozzle head.

4. A sprayer for metering two liquids separately received from external sources and thereafter mixing them within the sprayer at selected ratios and ejecting the thoroughly mixed liquid toward the object being sprayed, comprising: a barrel body; a first liquid chamber formed within said barrel body; inlet means for delivering a first liquid into first liquid chamber; a second liquid chamber formed within said barrel body; inlet means for delivering a second liquid into said second liquid chamber; wall means positioned between said first and second liquid chambers and having a first valve seat facing into said first liquid chamber and a second valve seat facing into said second liquid chamber; a first hollow valve stem extending partially at least into said first liquid chamber and having surface means formed on one end thereof for engaging said first valve seat, the second end of said first hollow valve stem terminating into a nozzle head; a second hollow valve stem extending partially at least into said second liquid chamber and having surface means formed on one end thereof for engaging said second valve seat, the second end of said second hollow valve stem being closed; means normally biasing the first and second hollow valve stems against their respective valve seats; and means for simultaneously moving said first and second hollow valve stem means away from their respective valve seats and thereby simultaneously communicating both the first and second liquid chambers with the hollow interior of said first hollow valve stem means.

5. A sprayer for metering two liquids separately received from external sources and thereafter mixing them within the sprayer at selected ratios and ejecting the thoroughly mixed liquids in an air mixture controlled by a surrounding air stream directed toward the object being sprayed, comprising: a barrel body; a first liquid chamber formed within said barrel body; inlet means for delivering a first liquid into said first liquid chamber; a second liquid chamber formed within said barrel body in axial alignment with said first liquid chamber; inlet means for delivering a second liquid into said second liquid chamber; wall means positioned between said first and second liquid chambers, said wall means including a first valve seat facing into said first liquid chamber and a second valve seat facing into said second liquid chamber; a first hollow valve stem extending partially at least into said first liquid chamber and having surface means formed on one end thereof for engaging said first valve seat, the second end of said first hollow valve stem terminating into a nozzle head; a second hollow valve stem extending partially at least into said second liquid chamber and having surface means formed on one end thereof for engaging said second valve seat; plug means closing the second end of said second hollow valve stem; means normally balancing the first and second hollow valve stems against their respective valve seats; means for simultaneously moving said first and second hollow valve stems away from their respective valve seats and thereby simultaneously communicating the first and second liquid chambers with the hollow interior of said first hollow valve stem, and means delivering air to said nozzle head in surrounding relationship to the second end of first hollow valve stem.

6. A sprayer for receiving purposely preseparated liquid in controlled ratios for subsequent mixing within the sprayer and ultimate and controlled ejection for depositing coating on surfaces and filling voids in all structures, comprising: a barrel body; a first liquid chamber formed within said barrel body; inlet means for delivering a first liquid into said first liquid chamber; a second liquid chamber formed within said barrel body in axial alignment with said first liquid chamber; inlet means for delivering a second liquid into said second liquid chamber; wall means positioned between said first and second liquid chambers, said wall means including a first valve seat facing into said first liquid chamber and a second valve seat facing into said second liquid chamber; a first hollow valve extending partially at least into said first liquid chamber and having surface means formed on one end thereof for engaging said first valve seat, the second end of such hollow valve stem terminating into a nozzle head; a second valve stem extending partially at least into said second liquid chamber and having surface means formed on one end thereof for engaging said second valve seat; means normally balancing the first and second hollow valve stems against their respective valve seats; means for simultaneously moving said first and second hollow valve stem means away from their respective valve seats and thereby simultaneously communicating both the first and second liquid chambers with the hollow interior of said first hollow valve stem; and overriding means to limit the axial travel of each hollow valve stem independently of the other hollow valve stem in accordance with preselected ratios of the initially separated liquids.

7. A sprayer for metering two liquids separately received from external sources and thereafter mixing them within the sprayer at selected ratios and ejecting the thoroughly mixed liquids in an air mixture controlled by a surrounding air stream directed toward the object being sprayed, comprising: a barrel body; a first liquid chamber formed within said barrel body; inlet means for delivering a first liquid into said first liquid chamber; a second liquid chamber formed within said barrel body in axial alignment with said first liquid chamber; inlet means for delivering a second liquid into said second liquid chamber; wall means positioned between said first and second liquid chambers, said wall means including a first valve seat facing into said first liquid chamber and a second valve seat facing into said second liquid chamber; a first hollow valve stem extending partially at least into said first liquid chamber and having surface means formed on one end thereof for engaging said first valve seat, the second end of such hollow valve stem terminating into a nozzle head; a second hollow valve stem extending partially at least into said second liquid chamber and having surface means formed on one end thereof for engaging said second valve seat; plug means closing the second end of said second hollow valve stem; spring means normally biasing the first and second hollow valve stems against their respective valve seats, means for simultaneously moving said first and second hollow valve stem means away from their respective valve seats and thereby simultaneously communicating both the first and second liquid chambers with the hollow interior of said first hollow valve stem, adjustable stop means to limit the axial travel of each hollow valve stem independently of the other hollow valve stem in accordance with preselected ratios of the initially separated liquids, and means for delivering air to said nozzle head in surrounding relationship to the second end of said first hollow valve stem, said means including valve means actuated by said means for simultaneously moving said first and second hollow valve stem means away from their respective valve seats.

8. A sprayer for receiving purposely preseparated liquids in controlled ratios for subsequent mixing within the sprayer and ultimate further mixing with air and controlled ejection with air for depositing coatings on surfaces and filling voids in all structures, comprising: a barrel body; a first liquid chamber formed within said barrel body; inlet means for delivering a first liquid into said first liquid chamber; a second liquid chamber formed within said barrel body in axial alignment with said first liquid chamber; inlet means for delivering a second liquid into said second liquid chamber; valve seat means positioned between said first and second liquid chambers and including a first valve seat facing into said first liquid chamber and a second valve seat facing into said second liquid chamber; a first hollow valve stem extending partially at least into said first liquid chamber and having surface means formed on one end thereof for engaging said first valve seat, the second end of said first hollow valve stem extending outwardly from one end of said barrel body; a second hollow valve stem extending partially at least into said second liquid chamber and having surface means formed on one end thereof for engaging said second valve seat; removable plug means closing the second end of said second hollow valve stem, spring means normally biasing the first and second hollow valve stems against their respective valve seats; a nozzle head surrounding said second end of said first valve stem, and defining an annular air chamber terminating in an annular discharge opening concentrically arranged with respect to the second end of said first hollow valve stem; openings formed within said first hollow valve stem for communicating said annular chamber with the interior thereof; and means for simultaneously moving said first and second hollow valve stem means away from their respective valve seats and delivering air to said annular chamber in said nozzle head, whereby the first and second liquid chambers are simultaneously communicated with the hollow interior of said first hollow valve stem and the first and second liquid are mixed therein and air flowing from the annular chamber through the openings is internally mixed with said liquid mixture and the resulting air-liquid mixture is ejected from the second end of said first hollow valve stem by action of the air flowing out through the annular air nozzle.

9. A hand operated sprayer comprising a barrel body; a first liquid chamber formed within said barrel body; inlet means for delivering a first liquid into said first liquid chamber; a second liquid chamber formed within said barrel body in axial alignment with said first liquid chamber; inlet means for delivering the second liquid into said second liquid chamber; valve seat means positioned between said first and second liquid chambers and including a first valve seat facing into said first liquid chamber and a second valve seat facing into said second liquid chamber, a first hollow valve stem extending partially at least into said first liquid chamber and having surface means formed on one end thereof for engaging said first valve seat, the second end of such first hollow valve stem terminating into a nozzle head; a second hollow valve stem extending partially at least into said second liquid chamber and having surface means formed on one end thereof for engaging said second valve seat; means closing the second end of said second hollow valve stem; means normally balancing the first and second hollow valve stems against their respective valve seats; and hand operated means including a trigger for moving said first and second hollow valve stem means away from their respective valve seats and thereby simultaneously communicating both the first and second liquid chambers with the hollow interior of said first hollow valve stem.

10. A hand operated sprayer in accordance with claim 9, wherein means are provided for delivering air to said nozzle in surrounding relationship to said second end of said first hollow valve stem whereby the liquid mixture is ejected from said first hollow valve stem by the air.

11. The hand operated sprayer in accordance with claim 10, wherein valve means are provided for controlling the quantity of air to be delivered to said nozzle head, said valve means being actuated by said trigger.

12. A sprayer for receiving purposely preseparated liquids in controlled ratio for subsequent mixing within the sprayer and ultimate controlled ejection for depositing coatings on surfaces and filling voids in all structures, comprising: a barrel body; a first liquid chamber formed within said barrel body; inlet means for delivering a first liquid into said first liquid chamber; a second liquid chamber formed within said barrel body in axial alignment with said first liquid chamber; inlet means for delivering a second liquid into said second liquid chamber; valve seat means positioned between said first and second liquid chambers and including a first valve seat facing into said first liquid chamber and a second valve seat facing into said second liquid chamber; a first hollow valve stem extending partially at least into said first liquid chamber and having surface means formed on one end thereof for engaging said first valve seat, the second end of such hollow valve stem terminating into a nozzle head; a second hollow valve stem extending partially at least into said liquid chamber and having surface means formed on one end thereof for engaging said second valve seat; means closing the second end of said second hollow valve stem; means normally biasing the first and second hollow valve stems against their respective valve seats; means for simultaneously moving said first and second hollow valve stems away from their respective valve seats and thereby simultaneously communicate both the first and second liquid chambers with the hollow interior of said first hollow valve stem; and bladed mixing means extending lengthwise through both of said first and second hollow valve stems and constituting a portion of the means for closing the second end of said second hollow valve stem, said mixing means being provided with motor means for rotating it about its longitudinal axis to provide mechanical mixing of the liquid mixture.

References Cited in the file of this patent

UNITED STATES PATENTS

| | | |
|---|---|---|
| 2,705,132 | Neville | Mar. 29, 1955 |
| 2,788,337 | Preiswerk et al. | Apr. 9, 1957 |
| 2,863,649 | Grubb et al. | Dec. 9, 1958 |
| 2,970,773 | Keryluk et al. | Feb. 7, 1961 |
| 2,992,194 | Paulsen | July 11, 1961 |